United States Patent
Nix, Jr. et al.

[15] 3,676,591
[45] July 11, 1972

[54] PHOTOCHROMIC DISPLAY DEVICE UTILIZING LIGHT VALVE ACTIVATION

[72] Inventors: Lawrence A. Nix, Jr.; David L. Balthis, both of Ellicott City, Md.

[73] Assignee: Westinghouse Electric Corporation, Pittsburgh, Pa.

[22] Filed: Jan. 28, 1971

[21] Appl. No.: 110,423

[52] U.S. Cl. ............178/7.5 D, 178/DIG. 31, 178/7.87, 350/160 P
[51] Int. Cl. ............................................H04n 5/74
[58] Field of Search ............178/DIG. 31, 7.5 D, 7.85, 7.86, 178/7.87; 350/160 P

[56] References Cited

UNITED STATES PATENTS 3,495,034   2/1970   Arend et al. ............178/DIG. 31

*Primary Examiner*—Robert L. Richardson
*Attorney*—F. H. Henson and C. F. Renz

[57] ABSTRACT

A photochromic display device in which a light valve projection system is utilized for activating the photochromic screen member to establish video information thereon. A uniform light source directs white light through the photochromic screen and is projected onto a viewing screen.

4 Claims, 1 Drawing Figure

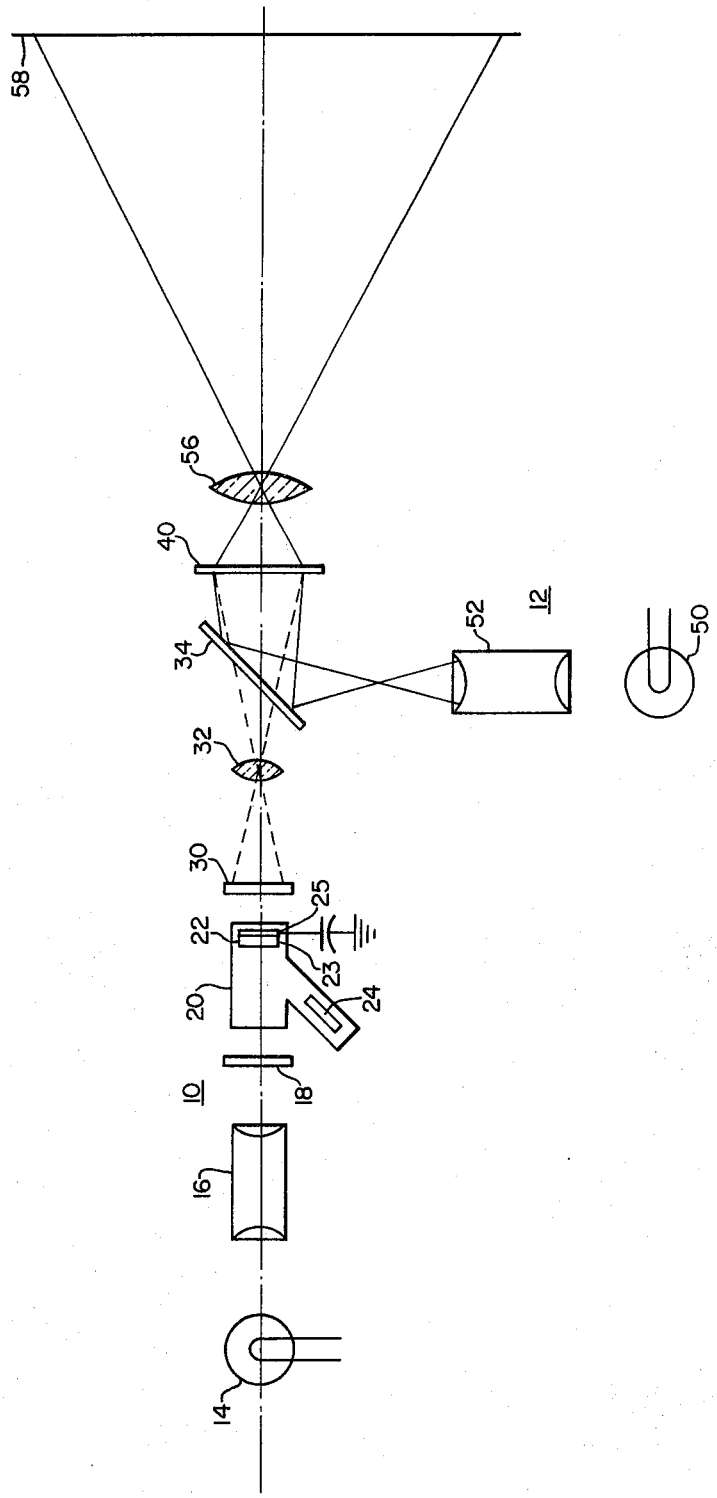

000
PHOTOCHROMIC DISPLAY DEVICE UTILIZING LIGHT VALVE ACTIVATION

BACKGROUND OF THE INVENTION

This invention relates to large screen display devices capable of high speed electronic control. The conventional cathode ray tube is suitable for applications up to screen diameters of 25 inches. Where larger display areas are required, a good solution to the problem has not been developed. Various approaches have been attempted in this area such as projection cathode ray tubes, "pockel cell" projection displays, and photochromic light valve systems. These systems suffer from either poor writing speed, poor frequency response, non-real time, poor light output, poor resolution, or various combinations of the above.

One projection system utilizes the pockel cell light valve. In this system, an electron beam is utilized to control the light transmission from point to point in a crystal material such as ammonium or potassium dihydrogen phosphate. This system appears to have acceptable resolution but has a very low efficiency as far as projection. The reason for this limitation appears to be that the light source must be very accurately collimated prior to being directed onto the pockel cell. This requires a very high power light source.

Another system is that utilizing a photochromic material such as Cyanamid's Type 51-142 which exhibits the properties of transmission of a certain portion of the electromagnetic spectrum controlled by radiation in another portion of the electromagnetic spectrum. In current photochromic displays, the transmission is in the visible region of the spectrum and is controlled by radiation in the ultraviolet region of the spectrum. The current practice is to excite the photochromic material with a high energy cathode ray tube having a phosphor which emits in the ultraviolet region. The major problem with the photochromic display system is a requirement that the present photochromic materials require about 0.1 watt-second exposure per square centimeter to ultraviolet light in the active region of the spectrum. If a display having reasonable resolution is to be obtained, several square centimeters of the photochromic materials must be employed. The present cathode ray tube art will permit a power input of about 0.6 watts per square centimeter without adverse affects on the ultraviolet phosphor. This limits the excitation energy available to about 75 or 80 milliwatts for a convention cathode ray tube or about 300 milliwatts from a direct view storage tube in that the phosphor is only about 7 percent efficient. These limitations result in a very low writing speed.

SUMMARY OF THE INVENTION

This invention relates to a large area display incorporating the best features of the pockel cell light valve system and the photochromic display system in such a way as to provide an improved system and remove the objectionable features of the light display systems mentioned above. More particularly, the system utilizes a pockel light valve to control an ultraviolet light source which in turn excites a photochromic screen. The pockel light valve provides adequate energy to provide the desired writing speed on the photochromic material. The photochromic projection permits the use of a wide aperture light collimator since only the control power for the photochromic screen need be handled by the pockel cell system. A relatively small light system is required to control the photochromic material in spite of the poor collimination efficiency of the pockel cell system. A high efficiency projection light source may be utilized in combination with the photochromic screen without the problem of requiring accurate collimation.

BRIEF DESCRIPTION OF THE DRAWING

For a better understanding of the invention, reference may be had to the drawing which illustrates a projection system of the preferred embodiment, exemplary of the invention and incorporating the teachings of this invention.

DESCRIPTION OF THE PREFERRED EMBODIMENT

Referring to the drawing, there is illustrated a pockel cell drive unit 10 and a projection photochromic display system 12. The pockel cell drive system 10 comprises a source of light 14 which provides an emission in the ultraviolet range. A suitable light source for this is a 100 watt mercury arc flood light. The light emitted by the source 14 is collimated by a suitable optical means 16 to provide a light beam consisting of rays substantially parallel to each other. The light after passing through the collimator 16 is directed through a polarizer 18 which polarizes the light. The light is then directed onto a pockel cell cathode ray tube 20. The pockel cell cathode ray tube 20 includes an evacuated envelope including a pockel cell screen member 22 of a layer 23 of suitable material such as potassium dihydrogen phosphate on an electrical conductive layer 25. This screen 22 is scanned by a suitable electron gun 24 which produces an electrical field pattern across the surfaces of the crystal 22 corresponding to video information applied to the electron gun 24. The light generated by the source 14 and after passing through the polarizer 18, is rotated at an amount corresponding to the electric field impressed across the crystal 22. The light after passing through the screen 22 is then directed through an analyzer 30. The analyzer 30 is a device similar to a polarizer 18 and is oriented at 90° to the polarizer 18 so that in the absence of any activation of the crystal 22, no light will pass beyond the analyzer 30. However, when the crystal 22 is activated by means of excitation by the electron gun 24 to impress a field across the screen 22 in a point by point manner, the light passing through the analyzer 30 is directed through a suitable focusing lens 32 and a dichroic mirror onto a photochromic cell 40. The cell 40 may be on any suitable photochromic material such as type 51-142 manufactured by American Cyanamid Co., Stamford, Connecticut. The dichroic mirror 34 has a coating of a suitable material such as that made by optical coating Lab., Inc., Santa Rosa, California which is transmissive in the ultraviolet range but is reflective in most of the visible region. A more complete description is found in Display System Engineering by Luxenbery & Kuehn and published by McGraw-Hill Book Company, 1968.

The photochromic projection system 12 consists of a light source 50 capable of emission of a wide spectral band within the visible region such as an Xenon arc. This light is directed through a suitable collimator 52 and is reflected by the dichroic mirror 34 onto the photochromic film 40. In the absence of any activation energy from the drive source 10, the photochromic cell 40 will be substantially transparent to the visible light from the source 50 and will pass through the photochromic film into a projection lens 56 and onto a viewing screen 58. If light from the drive system 10 is directed onto the photochromic film 40 from the drive source 10, then the film 40 will be made more opaque to provide an image in which the image is projected black on white.

We claim as our invention:

1. A display system for display of an image of an object from video signals comprising a first light source of a first wavelength, the light from said first source transmitted along a first optical path for projection of an image, a photochromic member positioned in said first optical path, a drive system for directing a scanning radiation beam over said photochromic screen to modify the opaqueness of said photochromic screen, said drive means comprising a second light source of a second wavelength, means for directing the light along a second optical path from said second source onto said photochromic screen, light valve control means positioned between said second light source and said light valve control means in said second optical path comprising an optically active screen member responsive to an electric field applied thereacross and means to scan a raster over said optically active material to modify the optical activity thereof in accordance with a video signal applied to said scanning means.

2. The display system set forth in claim 1 in which light valve means comprises a cathode ray tube and said scanning means is an electron beam, said optically active screen exhibiting the pockel effect, means for projecting the collimated light beam from said first source polarized in a predetermined acceptance plane toward and through said optically active screen, said optically active screen comprised of a plate of transparent non-conductive material having a layer of transparent electrically conductive material thereto and being connected to a potential source, said electron beam means scanning the surface of said non-conductive material to create an electric field between said surface and said electrical conductive layer to vary the optical properties thereof in response to the value of an electrical field thereacross and thereby modify the polarized condition of said polarized light passing therethrough and a polarizing means having an acceptance plane normal to the polarized condition of said light beam after passing said optically active screen when unexcited for intercepting the light beam from said second source after passing through said optically active screen and passing only the portion of said light beam having a modified polarization by said optically active screen.

3. The display system set forth in claim 1 in which said second light source emits light in the ultraviolet region.

4. The display system of claim 1 in which said photochromic screen is responsive to said second wavelength by a change in its opaqueness to said first wavelength and is substantially non-responsive to said first wavelength.

* * * * *